US009203095B2

(12) United States Patent
Roh et al.

(10) Patent No.: US 9,203,095 B2
(45) Date of Patent: Dec. 1, 2015

(54) METHOD FOR MANUFACTURING PALLADIUM-PLATINUM CORE-SHELL CATALYSTS FOR FUEL CELLS

(71) Applicants: Hyundai Motor Company, Seoul (KR); Kia Motors Corporation, Seoul (KR); Korea Advanced Institute of Science and Technology, Daejeon (KR)

(72) Inventors: Bum Wook Roh, Gyeonggi-do (KR); In Chul Hwang, Seoul (KR); Joon Taik Park, Daejeon (KR); Sang Il Choi, Daejeon (KR); Ran Choi, Gyeonggi-do (KR)

(73) Assignees: Hyundai Motor Company, Seoul (KR); Kia Motors Corporation, Seoul (KR); Korea Advanced Institute of Science and Technology, Daejeon (KR)

(*) Notice: Subject to any disclaimer, the term of this patent is extended or adjusted under 35 U.S.C. 154(b) by 553 days.

(21) Appl. No.: 13/690,812

(22) Filed: Nov. 30, 2012

(65) Prior Publication Data

US 2014/0024524 A1      Jan. 23, 2014

(30) Foreign Application Priority Data

Jul. 17, 2012      (KR) ........................ 10-2012-0077600

(51) Int. Cl.
*B01J 21/18* (2006.01)
*H01M 4/92* (2006.01)
(Continued)

(52) U.S. Cl.
CPC ................ *H01M 4/926* (2013.01); *B01J 13/02* (2013.01); *B32B 15/02* (2013.01); *B82Y 30/00* (2013.01);
(Continued)

(58) Field of Classification Search
None
See application file for complete search history.

(56) References Cited

U.S. PATENT DOCUMENTS

2003/0190475 A1* 10/2003 Carpenter et al. ............ 428/403
2010/0062929 A1   3/2010 Virkar
(Continued)

FOREIGN PATENT DOCUMENTS

| KR | 10-2006-0082595 | 7/2006 |
| KR | 10-2009-0045412 | 5/2009 |
| WO | 2008018926 A2 | 2/2008 |

OTHER PUBLICATIONS

Zhang et al, "Aqueous-Phase Synthesis of Sub 10 nm Pdcore@Ptshell Nanocatalysts for Oxygen Reduction Reaction Using Amphiphilic Triblock Copolymers as the Reductant and Capping Agent", J. Phys. Chem. C, 2013, 117, 13413-13423.*
Fang et al, "Tailoring Au-core Pd-shell Pt-cluster nanoparticles for enhanced electrocatalytic activity", Chem. Sci., 2011, 2, 531-539.*

*Primary Examiner* — Bijay Saha
(74) *Attorney, Agent, or Firm* — Mintz Levin Cohn Ferris Glovsky and Popeo, P.C.; Peter F. Corless

(57) ABSTRACT

The present invention discloses a method for manufacturing a palladium-platinum core-shell catalyst for a fuel cell. More specifically, the present invention discloses a method for manufacturing a palladium-platinum core-shell catalyst for a fuel cell, in which a platinum shell nano particle epitaxially grown on a palladium core is synthesized and dipped in a carbon support, thereby manufacturing the palladium-platinum core-shell catalyst for a hydrogen fuel cell, such that mass production of a uniform size is possible. Additionally, the techniques herein reduce the requirement for the use of expensive metal, which reduces the manufacturing cost of a fuel cell. Moreover, is the techniques herein are applicable to the field of high-efficiency hydrogen fuel cells having superior electric catalytic activity and durability.

12 Claims, 7 Drawing Sheets

(51) Int. Cl.
*B01J 13/02* (2006.01)
*B32B 15/02* (2006.01)
*B82Y 40/00* (2011.01)
*B82Y 30/00* (2011.01)

(52) U.S. Cl.
CPC *B82Y 40/00* (2013.01); *Y02E 60/50* (2013.01); *Y10S 977/734* (2013.01); *Y10S 977/742* (2013.01); *Y10S 977/773* (2013.01); *Y10S 977/896* (2013.01)

(56) References Cited

U.S. PATENT DOCUMENTS

| | | | |
|---|---|---|---|
| 2010/0177462 A1* | 7/2010 | Adzic et al. | 361/502 |
| 2011/0086295 A1* | 4/2011 | Lopez et al. | 429/524 |
| 2011/0129763 A1* | 6/2011 | Lee et al. | 429/532 |
| 2013/0056359 A1* | 3/2013 | Adzic et al. | 205/85 |
| 2013/0150235 A1* | 6/2013 | Roh | 502/185 |
| 2013/0177715 A1* | 7/2013 | Adzic et al. | 427/555 |
| 2015/0037711 A1* | 2/2015 | Cho et al. | 429/523 |

* cited by examiner

METHOD FOR MANUFACTURING PALLADIUM-PLATINUM CORE-SHELL CATALYSTS FOR FUEL CELLS

CROSS-REFERENCE TO RELATED APPLICATION

This application claims under 35 U.S.C. §119(a) the benefit of Korean Patent Application No. 10-2012-0077600, filed on Jul. 17, 2012, the entire contents of which are incorporated herein by reference.

BACKGROUND (a) Technical Field

The present invention relates to a method for manufacturing palladium-platinum core-shell catalysts for fuel cells and, more particularly, palladium-platinum core-shell catalysts that contain palladium-platinum core-shell nano particles having superior durability and catalyst activity.

(b) Background Art

There is a growing global interest in next-generation energy sources because of the impending exhaustion of fossil fuel resources. For example, hydrogen fuel cells have been actively studied in academic and industrial fields as an alternative eco-friendly energy source that does not produce any pollution. In particular, hydrogen fuel cells for vehicles are expected to replace conventional combustion engines based on petroleum in the near future.

A proton exchange membrane fuel cell (PEMFC) is a system that generates power by direct electrochemical reaction of hydrogen. PEMFCs are an eco-friendly energy source because hydrogen is oxidized in an anode and oxygen is reduced in a cathode, such that power is generated and water is the by-product of the reaction: other pollutants are not generated. A PEMFC has a relatively low operating temperature of about 50-100° C. and high energy density. For this reason, the PEMFC can be used as a compact energy source for residential use, as well as an engine for a vehicle. However, PEMFCs suffer from a number of disadvantages, including: a low-power energy density (e.g., due to low reaction speed), a requirement for a substantial quantity of platinum catalysts, a requirement for the removal of vapor generated on the surface of the electrode, etc.

At present, much research has been conducted to solve the foregoing problems for commercialization of the PEMFC. In particular, research for improving cell efficiency through improvement of fuel cell catalysts has been drawing a key interest. As a fuel cell catalyst, a pure platinum catalyst for oxygen reduction is conventionally known as having the highest activity. However, as a demand for platinum has increased, so has the price of platinum, which has increased substantially over the past ten years. Due to the increase of the price of platinum, it is desirable to synthesize a catalyst having higher electrical activity than pure platinum to reduce the use of platinum. To that end, research is being actively conducted on synthesis of a core-shell catalyst.

As to conventional core-shell catalyst synthesis, one conventional strategy has proposed an electrode catalyst in which a catalyst particle including an M-core/M-shell structure having palladium as an inner particle core, palladium and platinum as an outer particle shell is supported on a support (carbon black, graphite). Unfortunately, the catalyst activity of such an electrode catalyst is relatively low because a colloidal dispersion liquid is not removed.

Another conventional strategy has proposed a method for manufacturing an electrode catalyst for a fuel cell, by which an active particle of a core-shell structure including a metal compound particle composed of palladium and platinum, or a platinum-containing alloy coating layer formed on the entire surface of the particle, dissolves a precursor compound including palladium, thus manufacturing a precursor liquid, and the metal compound particle is dried while being dip-coated in a catalyst substrate. Unfortunately, a disadvantage of this method is that the size of the catalyst particle is not uniform.

Additionally, when a palladium-platinum core-shell nano particle catalyst is synthesized using an underpotential deposition (UPD) method, interaction with the medium generated during reduction of platinum and oxygen existing on the surface becomes weak due to the influence of the core substance (e.g., palladium), such that 5 times or more of activity per unit mass is shown. It has also been shown that the palladium-platinum core-shell nano catalyst synthesized in this way has high durability as a catalyst because the core substance improves the stability of platinum of the shell. Unfortunately, the foregoing method synthesizes the catalyst on an operating electrode, a carbon electrode, such that mass production is inevitable and nano particles of a uniform size are difficult to synthesize.

Moreover, in case of the above-described palladium-platinum core-shell nano particle synthesized using the previously reported colloidal synthesis method, the particle size is as large as 20 nm or more, and nano particles in which platinum particles are reduced in the shape of a branch on the palladium core are reported. Accordingly, there is a need for a method of synthesizing a nano-particle catalyst of 10 nm or less in the palladium-platinum core-shell form.

SUMMARY OF THE DISCLOSURE

To solve the foregoing problems of the conventional art, epitaxially growing platinum shell nano particles are synthesized on a palladium core and dip-coated in a carbon support, thus manufacturing an oxygen reduction catalyst for a hydrogen fuel cell, which satisfies both catalyst activity and durability.

Accordingly, the present invention provides a method for manufacturing a palladium-platinum core-shell catalyst having higher catalyst activity and superior durability than conventionally known catalysts.

In one aspect, the present invention provides a method for manufacturing a palladium-platinum core-shell catalyst, the method including (a) dissolving a palladium precursor and a surface stabilizer in an organic solvent to manufacture a mixture solution, (b) increasing a temperature of the mixture solution in a noble gas atmosphere to manufacture a sol mixed with a palladium core nano particle, (c) mixing a platinum precursor solution in the sol to manufacture a mixture, (d) increasing a temperature of the mixture in a noble gas atmosphere to manufacture a nano particle in a palladium-platinum core-shell form, (e) causing the nano particle in the palladium-platinum core-shell form to adsorb a carbon support to manufacture a palladium-platinum core-shell catalyst, and (f) removing a surface stabilizer from the palladium-platinum core-shell catalyst.

Other aspects and preferred embodiments of the invention are discussed infra.

BRIEF DESCRIPTION OF THE DRAWINGS

The above and other features of the present invention will now be described in detail with reference to an exemplary embodiment thereof illustrated by the accompanying drawings, which are given hereinbelow by way of illustration only, and thus are not limitative of the present invention, and wherein.

Figure 1:
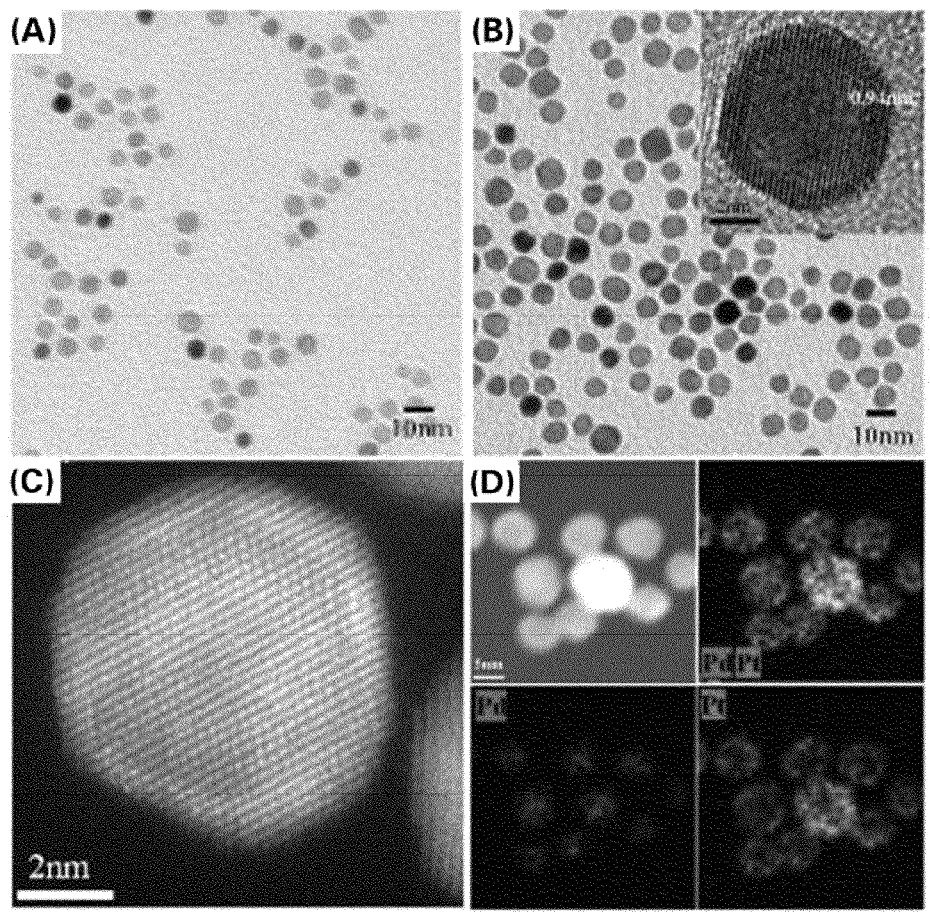
FIG. 1A is a low-magnification transmission electron microscope (TEM) picture of a palladium nano particle, which is a core substance of exemplary embodiment 1 according to the present invention.
FIG. 1B is a low-magnification TEM picture of a palladium-platinum core-shell nano particle manufactured by exemplary embodiment 2 according to the present invention (a high-magnification TEM picture is shown in the inset)
FIG. 1C is a dark field image taken of the particle manufactured by exemplary embodiment 2 using a scanning electron microscope (SEM) whose spherical aberration is corrected.
FIG. 1D is a picture of element mapping using the dark field image of FIG. 1C.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter, an exemplary embodiment of the present invention will be described in detail with reference to the accompanying drawings to allow those of ordinary skill in the art to easily carry out the present invention. While the invention will be described in conjunction with the exemplary embodiment, it will be understood that the present description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims. Hereinafter, the present invention will be described in more detail with reference to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention provides a method of manufacturing a palladium-platinum core-shell catalyst including:

(a) dissolving a palladium precursor and a surface stabilizer in an organic solvent to manufacture a mixture solution;

(b) increasing a temperature of the mixture solution in a noble gas atmosphere to manufacture a sol mixed with a palladium core nano particle;

(c) mixing a platinum precursor solution in the sol to manufacture a mixture;

(d) increasing a temperature of the mixture in a noble gas atmosphere to manufacture a nano particle in a palladium-platinum core-shell form;

(e) causing the nano particle in the palladium-platinum core-shell form to adsorb a carbon support to manufacture a palladium-platinum core-shell catalyst; and (f) removing a surface stabilizer from the palladium-platinum core-shell catalyst.

According to an exemplary embodiment of the present invention, in step (a), a palladium precursor preferably includes one or more precursors selected from the group consisting of sodium tetrachloro palladate ($Na_2PdCl_4$), potassium tetrachloro palladate ($K_2PdCl_4$), and platinum chloride ($PtCl_2$). When palladium is used as a core, activity of platinum existing on the surface may be improved and durability may also be increased. At the same time, the activity per unit mass of a conventionally well known platinum catalyst as an oxidization reduction catalyst for a hydrogen fuel cell may also be significantly increased.

According to an exemplary embodiment of the present invention, in step (a), when the palladium core nano particle is manufactured, a surfactant serving as the surface stabilizer may be added to the colloidal nano particle so that core nano particles are arranged without being agglomerated, which allows the platinum nano particle to epitaxially grow on the palladium core. Accordingly, the palladium-platinum core-shell nano particle manufactured by the method described herein may be loaded in a relatively small amount, thus having high catalyst activity. According to the techniques herein, the surface stabilizer may be one or more stabilizers selected from the group consisting of polyvinylpyrrolidone (PVP), sodium dodecyl sulfate (SDS), and polyethylene glycol (PEG).

According to an exemplary embodiment of the present invention, in step (a), as a reductant for manufacturing the palladium core nano particle, any solvent may be used as long as it can simultaneously reduce and dissolve the precursors. As the organic solvent used as the reductant, one or more, and preferably, a mixture of two or more selected from among ethylene glycol, 1,3-propanediol, 1,5-pentadiol, and diethylene glycol may be used. More preferably, a mixture of ethylene glycol and diethylene glycol may be used. More preferably, the ethylene glycol and diethylene glycol may be mixed in a ratio of 7:3.

The organic solvent is not limited to a particular amount: the amount need only be sufficient to dissolve the palladium precursor and the surface stabilizer. However, when the palladium precursor is added in an amount of 0.17 mmol and the surface stabilizer is added in an amount of 0.85 mmol, the organic solvent may preferably be added in an amount of 10 ml.

According to an exemplary embodiment of the present invention, in step (a), the surface stabilizer may preferably be added in an amount of 0.1-10 mol, and more preferably, 0.3-5.0 mol, with respect to the palladium precursor of 1 mol. This value is based on a repeated monomer of polyvinylpyrrolidone (PVP), and the surface stabilizer may be added in an amount of 5 mol.

According to an exemplary embodiment of the present invention, step (b) may be performed for 1-200 minutes at an increased temperature of 100-300° C. in a noble gas atmosphere. Most preferably, it may be desirable to perform step (b) for 60-120 minutes at an increased temperature of 200° C. to improve the reduction reaction of the palladium precursor, thus synthesizing the palladium core nano particle. The noble gas serves to prevent metals reduced from the palladium precursor by the reductant from being oxidized by oxygen in the air. According to the techniques herein, the noble gas may be selected from the group consisting of nitrogen, helium, argon, neon, krypton, xenon, radon, etc., and any combination thereof.

According to an exemplary embodiment of the present invention, in step (c), the temperature may be reduced to room temperature and an aqueous solution in which the platinum precursor is dissolved may be added. The platinum precursor may preferably be one or more selected from the group consisting of sodium tetrachloro platinate ($Na_2PtCl_4$), potassium tetrachloro platinate ($K_2PtCl_4$), platinum chloride ($PtCl_2$), and chloroplatinic acid ($H_2PtCl_6$).

According to an exemplary embodiment of the present invention, in step (c), the platinum precursor may be mixed in an amount of 0.1-5 mol with respect to 1 mol of the palladium precursor. According to the techniques herein, if the amount of the platinum precursor is less than 0.1 mol, the thickness of the shell may be reduced, which will likely degrade its durability; however, if the amount of platinum precursor is more than 5.0 mol, the influence of the core may become weak, which will likely reduce activity when electric characteristics are measured. Preferably, the platinum precursor may be mixed in an amount of 0.5-2.0 mol. Most preferably, 1.5 mol of the platinum precursor may be mixed with 1 mol of the palladium precursor.

According to an exemplary embodiment of the present invention, step (d) may be performed for 1-200 minutes at an increased temperature of 100-300° C. in a noble gas atmosphere. Most preferably, step (d) may be performed for 90-150 minutes at a speed of 1-2° C./min at an increased temperature of 110-160° C. to synthesize the palladium-platinum core-shell nano particle.

According to an exemplary embodiment of the present invention, in step (e), the palladium-platinum core-shell nano particle may be dispersed in the organic solvent and then adsorbed to the support to manufacture the oxygen reduction catalyst for the hydrogen fuel cell, and the support may be any one as long as it can be used as a catalyst support. Preferably, a carbon support containing carbon as its main component may be used, and the carbon support may be one selected from among Ketjen black carbon, a carbon nano tube, and fullerene.

According to an exemplary embodiment of the present invention, in step (e), the palladium-platinum core-shell nano particle may be adsorbed in an amount of 10-60 weight % with respect to the carbon support. If the palladium-platinum core-shell nano particle is less than 10 weight % with respect to the carbon support, an active component of the catalyst may not be sufficient; however, if the palladium-platinum core-shell nano particle is more than 60 weight %, there may be no distinct improvement in the activity effect of the catalyst, and due to insufficiency of the support component of the catalyst, the mechanical properties may also be degraded.

According to an exemplary embodiment of the present invention, in step (f), the palladium-platinum core-shell catalyst may remove the organic solvent and the surface stabilizer which are left during reaction through a cleaning process using water and ethanol. More specifically, the temperature may be reduced to room temperature and to obtain the nano particle dissolved in the solution, the solvent which cannot dissolve the nano particle may added to generate a deposit, after which centrifugation may be performed to remove an upper layer portion. The solvent may be one or more selected from acetone, hexane, and toluene, and centrifugation may be performed for 20-30 minutes at 3000-4000 rpm.

The deposit left after removal of the upper layer portion may be dissolved in an easily soluble solvent (e.g., a solvent may be one or more selected from among water, ethanol, and methanol). By repeating this process several times, the surface stabilizer and the organic solvent used for reaction may be removed. In addition, through thermal processing for 1 hour at 200° C. in a hydrogen atmosphere, the palladium-platinum core-shell catalyst from which the surface stabilizer is removed may be manufactured.

According to an exemplary embodiment of the present invention, the palladium-platinum core-shell catalyst may have a uniform particle size of 1-10 nm.

Therefore, the palladium-platinum core-shell catalyst may be mass-produced in a uniform size through a simple process, and by reducing the use of expensive metal (e.g., platinum), the manufacturing cost can be reduced. In addition, by maintaining the spherical shape with epitaxial growth of the platinum nano particles forming the shell, changes in the shape and surface area due to agglomeration are prevented, such that excellent electric catalyst activity and durability may be achieved.

Hereinafter, the present invention will be described in more detail based on the following exemplary embodiment, but the present invention is not so limited.

Embodiment 1: Synthesis of Palladium-Platinum Core-Shell Nano Particle

In an argon (Ar) atmosphere, sodium tetrachloro palladate (0.050 g, 0.017 mmol) and polyvinylpyrrolidone (0.0944 g, 0.085 mmol) were dissolved in ethylene glycol (7 mL) and dyethylene glycol (3 mL), and then heated for 60 minutes at 200° C. Thereafter, 1.5 mol of sodium tetrachloro platinate ($Na_2PtCl_4$) was mixed to the reaction mixture, after which heat was removed to adjust the temperature to room temperature. 20 ml of acetone was added and deposited for 30 minutes at 4000 rpm using a centrifugal machine, after which the upper layer of liquid was removed and a black deposit was dispersed in ethanol. Acetone and hexane were added and deposited using the centrifugal machine. After repeating such a process several times, a black deposit was dispersed in the remaining ethanol solvent, thus obtaining a palladium-platinum core-shell nano particle.

Embodiment 2: Manufacturing of Palladium-Platinum Core-Shell Catalyst

By using the palladium-platinum core-shell nano particle manufactured by Embodiment 1, an oxidation/reduction catalyst for a hydrogen fuel cell was manufactured. 60 weight % of the palladium-platinum core-shell nano particle with respect to the weight of the carbon support was put into an ethanol solution and dispersed using an ultrasonic disperser. Thereafter, the palladium-platinum core-shell nano particles were added to a suspension containing the carbon support, Ketjen black carbon, and then dispersed for 5 hours or more using the ultrasonic disperser, thereby manufacturing a hydrogen fuel cell catalyst in which the palladium-platinum core-shell nano particle is adsorbed to the carbon support.

The catalyst for the hydrogen fuel cell was cleaned in water and ethanol several times to remove any surface stabilizer of the catalyst, after which the upper layer liquid was removed using the centrifugal machine and the remaining substance was completely removed under vacuum. To further remove the surface stabilizer, thermal processing was performed for 1 hour at 200° C. in a hydrogen atmosphere, thereby manufacturing an oxidation/reduction catalyst for the hydrogen fuel cell, that is, a palladium-platinum core-shell catalyst from which the surface stabilizer is removed.

EXPERIMENTAL EXAMPLE 1

Transmission Electron Microscope Analysis of Palladium-Platinum Core-Shell Nano Particle The palladium-platinum core-shell nano particle manufactured by Embodiment 1 was observed by a transmission electron microscope (TEM) and the result is shown in FIGS. 1A through 1D. FIG. 1A is a low-magnification TEM picture of a palladium nano particle, which is a core substance of Embodiment 1 according to the present invention. FIG. 1B is a low-magnification TEM picture of a palladium-platinum core-shell nano particle manufactured by Embodiment 2 according to the present invention, and the inset is a high-magnification TEM picture of the same particle. FIG. 1C is a dark field image picture of the particles shown in FIG. 1B taken using a scanning electron microscope whose spherical aberration is corrected. FIG. 1D is a picture of element mapping using the dark field image of FIG. 1C.

As shown in FIGS. 1A through 1D, a palladium core nano particle having a size of 6.0±1.1 nm was synthesized, and a palladium-platinum core-shell nano particle having a size of 7.9±1.2 nm was epitaxially grown on the core nano particle. It can be seen from the high-magnification transmission electron microscope picture of FIG. 1B that a core-shell nano particle having a thickness of 0.94 nm was synthesized. From a dark field image picture taken using a scanning electron microscope of FIG. 1C and element mapping of FIG. 1D, the structure of the palladium-platinum core-shell may be seen. Moreover, as a result of analyzing a composition of a palladium-platinum core-shell nano particle by using an inductively coupled plasma atomic emission spectrometry (ICP-AES), element percentages of palladium and platinum were determined to be 39.9% and 60.1%, respectively. Accordingly, it can be seen that the techniques herein provide that a nano particle having an atom ratio of 1:1.51 may be synthesized. Such a result is the same as a mol ratio of the added reactant, which means that synthesis has been made without loss of an organic metal precursor.

EXPERIMENTAL EXAMPLE 2

Figure 2:
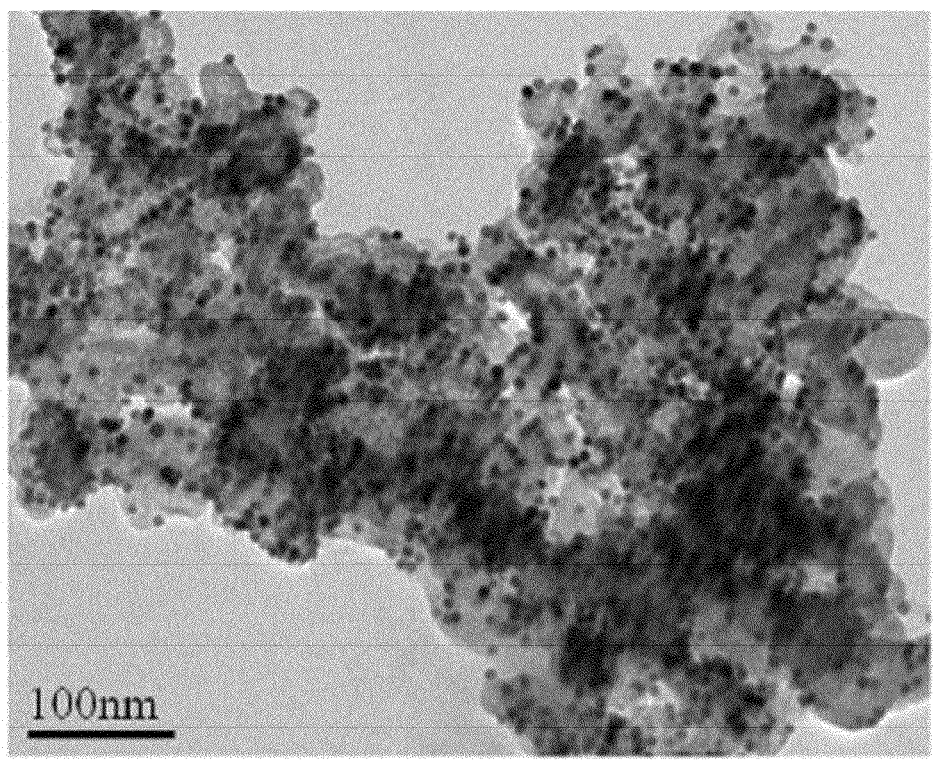
FIG. 2 is a TEM picture of a palladium-platinum core-shell catalyst manufactured by exemplary embodiment 2 according to the present invention.

Analysis of Shape and Structure Change of Palladium-Platinum Core-Shell Nano Particle A catalyst in which the palladium-platinum core-shell nano particle of Embodiment 2 was dipped in the carbon support was observed using the transmission electron microscope to see the shape and structure change of the palladium-platinum core-shell nano particle, and the results are shown in FIG. 2.

When the palladium-platinum core-shell nano particle was adsorbed to the carbon support by using the carbon support, Ketjen black carbon in Embodiment 2, there was no change in the shape and structure of the palladium-platinum core-shell nano particle. Additionally, it can also be seen that there was no change even after removal of the surface stabilizer from the hydrogen fuel cell catalyst through several times of cleaning and thermal processing in the hydrogen atmosphere.

EXPERIMENTAL EXAMPLE 3

Cyclic Voltage-Current Measurement of Palladium-Platinum Core-Shell Catalyst 5 mg of the oxidation/reduction catalyst for the hydrogen fuel cell containing the palladium-platinum core-shell nano particle manufactured by Embodiment 2 and 0.10 mL of Nafion perfluorinated ion-exchange resin (Aldrich Co.) were put into 1 mL of distilled water and dispersed for about 10 minutes by using an ultrasonic disperser. A pure water solution of 5 μl was injected to the carbon electrode surface by using an injector. This electrode was carefully dried at a 70° C. in an oven, such that the palladium-platinum core-shell ink solution could be evenly coated over the entire area of a 3 mm-diameter disk.

The cyclic voltage-current method was performed by using an Autolab(PGSTAT 10, Eco Chemie, Netherlands) electrochemical analysis device with a general three-electrode system, that is, a carbon working electrode (3 mm-diameter disk, BAS), a platinum counterpart electrode (a 0.5 mm-diameter and 5 cm-long line, BAS), and silver-chloride reference electrode (Ag/AgCl in saturated NaCl). By using 1.0M of a perchloric acid solution, a potential difference of 20 mV/s was applied in the saturated nitrogen atmosphere, and was measured in a voltage range of −0.2V to 1.0V.

Figure 3:
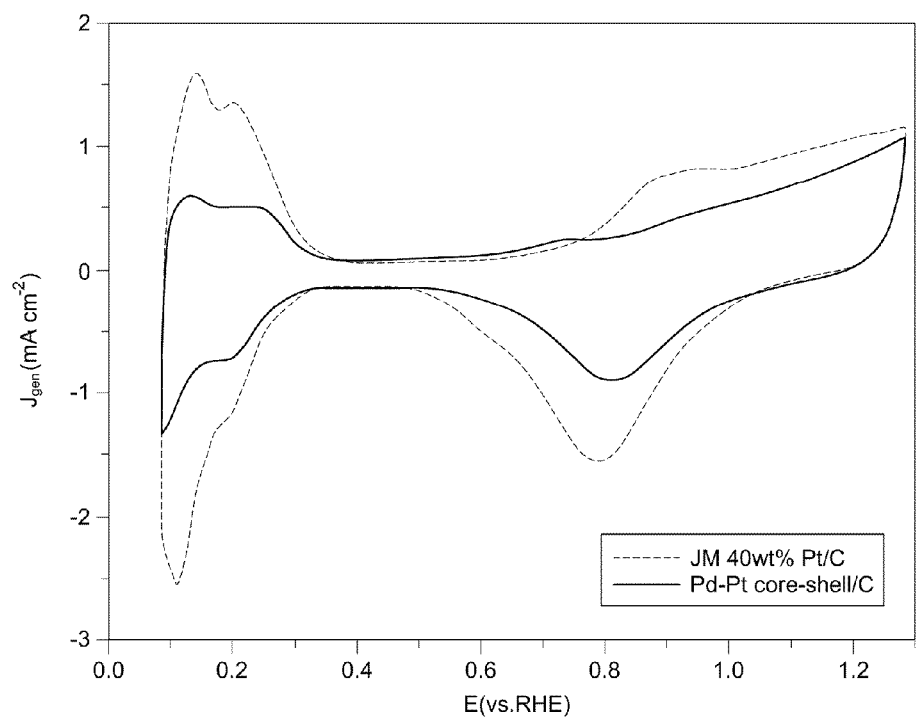
FIG. 3 is a graph showing cyclic voltammograms of a palladium-platinum core-shell catalyst (solid line) manufactured by exemplary embodiment 2 according to the present invention and a commercial catalyst (dotted line)

The reaction surface area of the oxidation/reduction catalyst for the hydrogen fuel cell containing the palladium-platinum core-shell nano particle manufactured using Embodiment 2 was measured and the result thereof are shown in FIG. 3, which illustrates that the hydrogen fuel cell catalyst (solid line) containing the palladium-platinum core-shell nano particle has a 1.8-time smaller surface area than that of the commercial catalyst (Johnson Matthey catalyst, solid line).

EXPERIMENTAL EXAMPLE 4

Oxygen/Reduction Reaction Activity Measurement of Palladium-Platinum Core-Shell Catalyst 5 μl of the palladium-platinum core-shell ink solution manufactured by Experimental Example 3 was injected to the carbon electrode surface by using an injector. This electrode was carefully dried at a 70° C. in an oven, such that the palladium-platinum core-shell ink solution could be evenly coated over the entire area of a 3 mm-diameter disk.

A method for measuring the activity of an oxygen reduction reaction applied a potential difference of 10 mV/s in a saturated oxygen atmosphere, and measured the activity in a voltage range of 0.2V-1.0V by using 1.0M of a perchloric acid solution. The working electrode to which the catalyst was applied was rotated at 400 rpm, 900 rpm, 1600 rpm, 2500 rpm, and 3600 rpm to measure the activity of the oxygen reduction reaction, and by using the measurement result, kinetic activity per unit area and activity per unit mass at 0.9V can be obtained.

Figure 4:
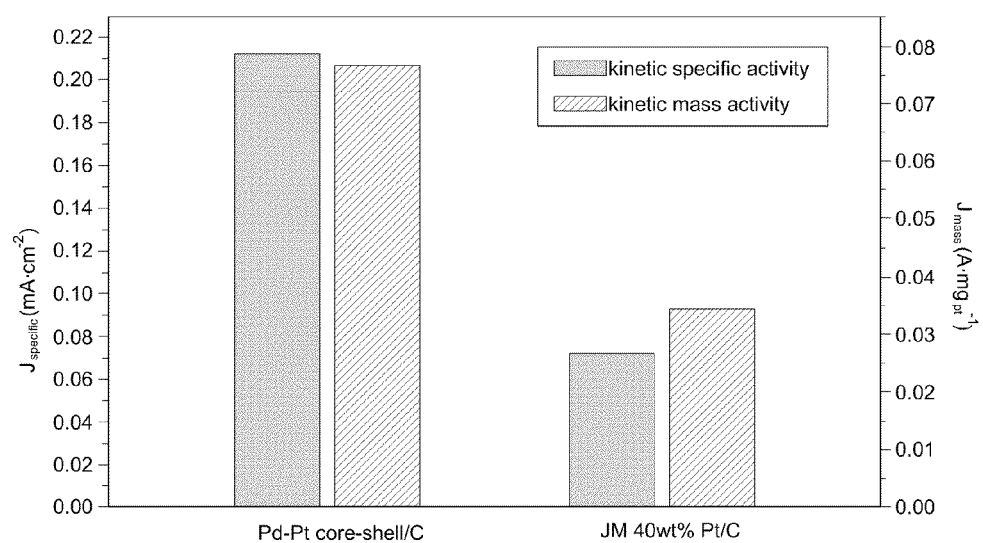
FIG. 4 is a graph showing kinetic activity per unit area (filled bar graph) and activity per unit mass (dashed bar graph) of a palladium-platinum core-shell catalyst manufactured by exemplary embodiment 2 according to the present invention and a commercial catalyst at 0.9V.

The kinetic activity per unit area and the activity per unit mass at 0.9V for the hydrogen fuel cell catalyst containing the palladium-platinum core-shell nano particle manufactured by Embodiment 2 are shown in FIG. 4.

FIG. 4 is a graph showing kinetic activity per unit area (filled bar graph) and activity per unit mass (dashed bar graph) of a catalyst containing a palladium-platinum core-shell nano particle and a commercial catalyst at 0.9V. From FIG. 4, it can be seen that the hydrogen fuel cell catalyst containing the palladium-platinum core-shell nano particle has a kinetic activity per unit area and an activity per unit mass which are 2.9 times and 2.2 times higher than those of the commercial catalyst, respectively. This means that the palladium-platinum core-shell catalyst having a uniform size and having the surface stabilizer removed therefrom shows superior catalyst activity in terms of electrochemical properties.

EXPERIMENTAL EXAMPLE 5

Measurement of Durability of Palladium-Platinum Core-Shell Catalyst

5 μl of the palladium-platinum core-shell ink solution manufactured by Experimental Example 3 was injected to the carbon electrode surface by using an injector. This electrode was carefully dried at a 70° C. in an oven, such that the palladium-platinum core-shell ink solution could be evenly coated over the entire area of a 3 mm-diameter disk.

Figure 5A:
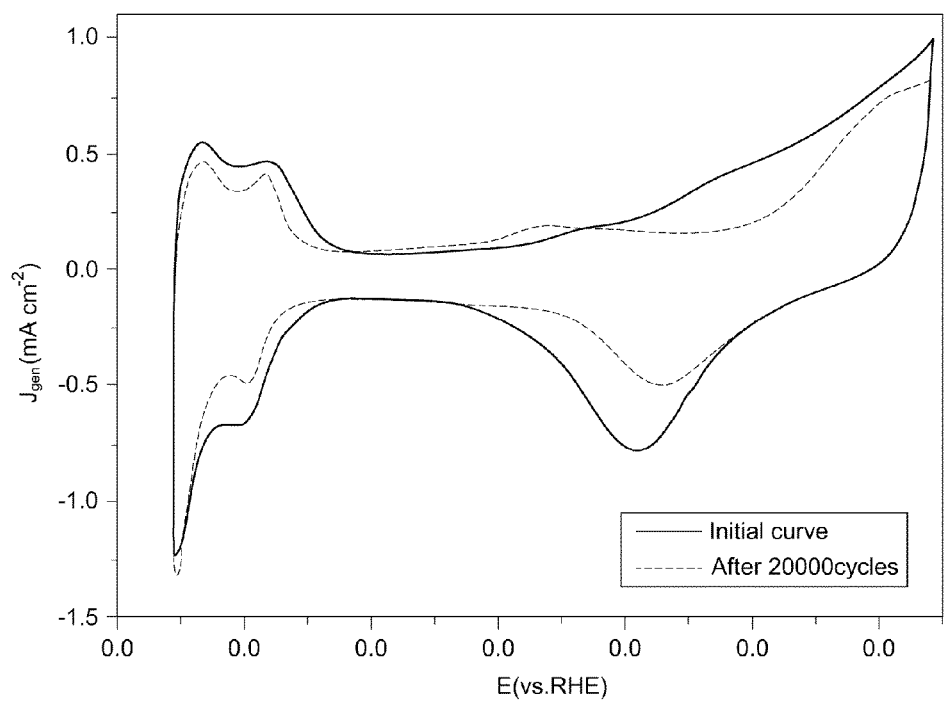
FIG. 5A is a graph showing an initial cyclic voltammogram (dotted line) of a palladium-platinum core-shell catalyst manufactured by exemplary embodiment 2 according to the present invention and a cyclic voltammogram (solid line) of the palladium-platinum core-shell catalyst after 20000 durability tests.

A method for measuring durability as an oxygen reduction catalyst executed 20000 cycles in a voltage range of 0.6V-1.1V (vs. a standard hydrogen electrode), after which a potential difference of 20 mV/s was applied by using 1.0M of a nitrogen-saturated perchloric acid solution and in a voltage range of −0.2V-1.0V, the reaction surface area of the catalyst was measured using the cyclic voltage-current method, and the result is shown in FIG. 5A.

Figure 5B:
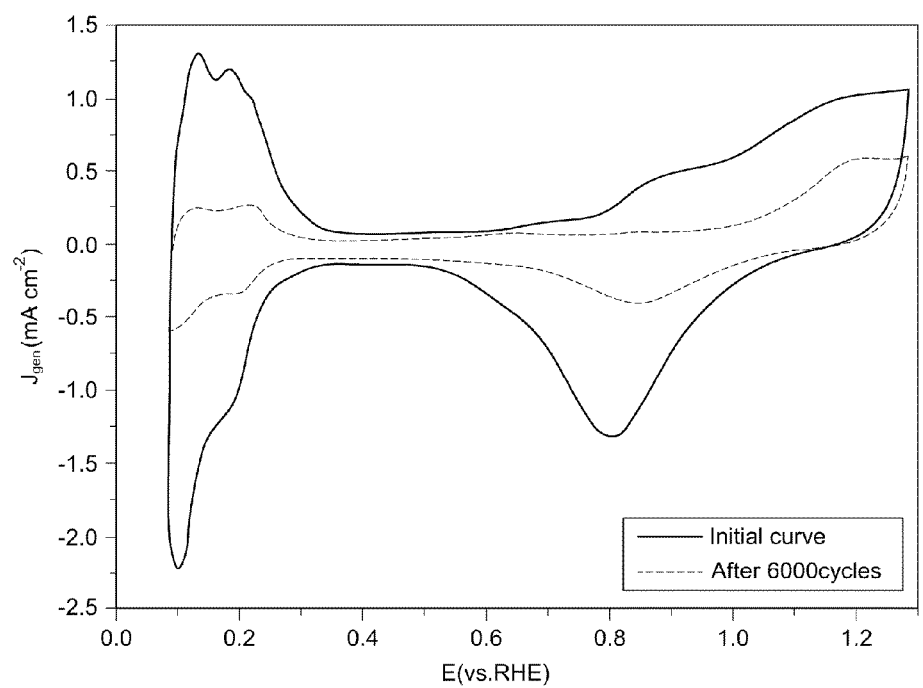
FIG. 5B is a graph showing an initial cyclic voltammogram (dotted line) of a commercial catalyst and a cyclic voltammogram (solid line) of the commercial catalyst after 6000 durability tests.
Figure 5C:
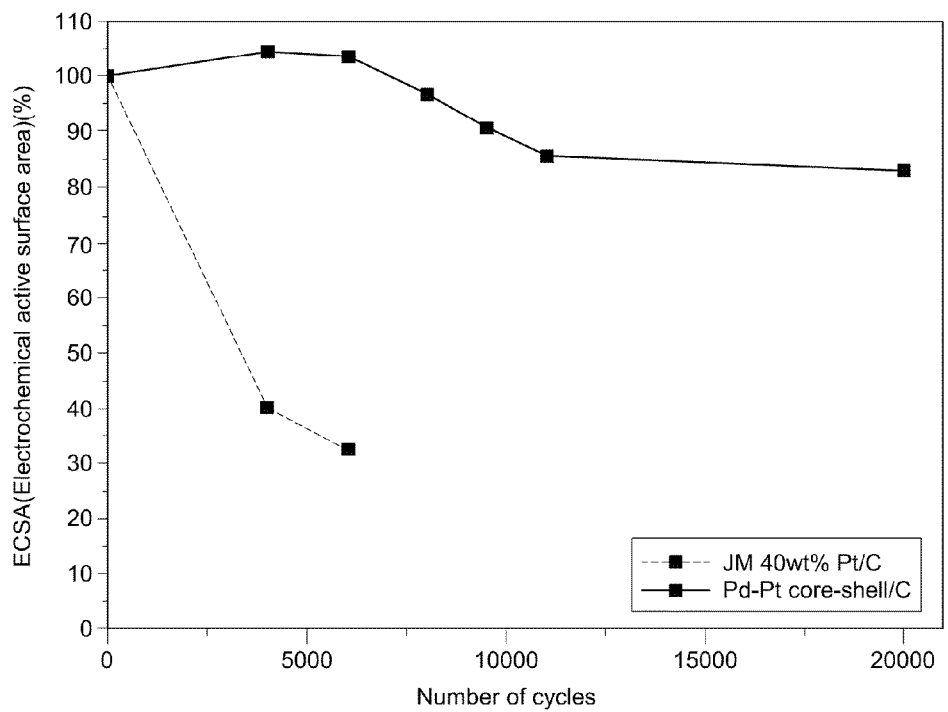
FIG. 5C is a graph showing changes in a reacting surface according to the progress of a durability test with respect to a palladium-platinum core-shell catalyst (solid line) manufactured by exemplary embodiment 2 according to the present invention and a commercial catalyst (dotted line).

For the commercial catalyst, measurement was performed in the foregoing manner, except that 6000 cycles were executed to measure durability, and the result is shown in FIG. 5B. As a result, the amount of change in the reaction surface area of the hydrogen fuel cell catalyst (solid line) containing the palladium-platinum core-shell nano particle is smaller than that of the commercial catalyst (dotted line). The result is shown as the graph of FIG. 5C from which it can be seen that as a result of the durability test, the reaction surface area of the palladium-platinum core-shell nano particle catalyst is reduced by 17%, but that of the commercial catalyst is reduced by 67%. Thus, it can also be seen that the palladium-platinum core-shell catalyst has excellent durability as well as superior catalyst activity in terms of electrochemical properties.

Therefore, the palladium-platinum core-shell catalyst shows superior catalyst activity in terms of electrochemical properties through a simple process, and in particular, when compared to a conventional catalyst, the palladium-platinum core-shell catalyst has a uniform size of 10 nm or less, maintains a spherical shape with the epitaxial growth of the platinum nano particles of the shell, and prevents the shape and surface area from being changed due to agglomeration, such that the palladium-platinum core-shell catalyst is expected to play an important role in development of high-efficiency fuel cell catalysts.

According to the present invention, the platinum shell nano particle epitaxially grown on the palladium core is synthesized and dipped in the carbon support, thereby manufacturing the palladium-platinum core-shell catalyst for the hydrogen fuel cell, such that mass production of a uniform size is possible and the use of expensive metal is reduced, thus cutting down on the manufacturing cost.

Moreover, by maintaining the spherical shape with the epitaxial growth of the platinum nano particles of the shell, the shape change and the surface area change, which may originate from a lump, can be prevented, and therefore, the present invention may be usefully applied to the field of high-efficiency hydrogen fuel cells having superior electric catalytic activity and durability.

While an exemplary embodiment of the present invention has been described in detail, the protection scope of the present invention is not limited to the foregoing embodiment and it will be appreciated by those skilled in the art that various modifications and improvements using the basic concept of the present invention defined in the appended claims are also included in the protection scope of the present invention.

What is claimed is:

1. A method for manufacturing a palladium-platinum core-shell catalyst for a hydrogen fuel cell, the method comprising:
   (a) dissolving a palladium precursor and a surface stabilizer in an organic solvent to prepare a mixture solution;
   (b) increasing a temperature of the mixture solution in a noble gas atmosphere to manufacture a sol mixed with a palladium core nano particle;
   (c) mixing a platinum precursor solution in the sol to prepare a mixture;
   (d) increasing a temperature of the mixture in the noble gas atmosphere to prepare a nano particle in a palladium-platinum core-shell form;
   (e) adsorbing the nano particle to a carbon support to manufacture a palladium-platinum core-shell catalyst;
   wherein the palladium-platinum core-shell nano particle is adsorbed at 10-60 weight% relative to the weight of the carbon support;
   wherein the palladium-platinum core-shell catalyst has a particle size that ranges from about 1 to about 10 nm; and wherein the surface stabilizer is selected from the group consisting of polyvinylpyrrolidone (PVP), sodium dodecyl sulfate (SDS), polyethylene glycol (PEG), and any combination thereof.

2. The method of claim 1, further comprising:
(f) removing the surface stabilizer from the palladium-platinum core-shell catalyst.

3. The method of claim 1, wherein the palladium precursor is selected from the group consisting of sodium tetrachloro palladate ($Na_2PdCl_4$), potassium tetrachloro palladate ($K_2PdCl_4$), palladium chloride ($PdCl_2$), and any combination thereof.

4. The method of claim 1, wherein the organic solvent is selected from group consisting of ethylene glycol, 1,3-propanediol, 1,5-pentadiol, diethylene glycol, and any combination thereof.

5. The method of claim 1, wherein the surface stabilizer is added in the range of 0.1-10 mol relative to 1 mol of the palladium precursor.

6. The method of claim 1, wherein the temperature of step (b) ranges from about 100 to about 300° C.

7. The method of claim 6, wherein step (b) is performed for a time that ranges from about 1 to about 200 minutes.

8. The method of claim 1, wherein the platinum precursor is selected from the group consisting of sodium tetrachloro platinate ($Na_2PtCl_4$), potassium tetrachloro platinate ($K_2PtCl_4$), platinum chloride ($PtCl_2$), chloroplatinic acid ($H_2PtCl_6$), and any combination thereof.

9. The method of claim 1, wherein the platinum precursor is added in an amount that ranges from about 0.1 to about 5 mol relative to 1 mol of the palladium precursor.

10. The method of claim 1, wherein the temperature of step (d) ranges from about 100 to about 300° C.

11. The method of claim 10, wherein step (d) is performed for a time that ranges from about 1 to about 200 minutes.

12. The method of claim 1, wherein the carbon support is selected from the group consisting of a Ketjen black carbon, a carbon nano tube, and a fullerene.

\* \* \* \* \*